United States Patent [19]
Frederiksen et al.

[11] Patent Number: 5,189,871
[45] Date of Patent: Mar. 2, 1993

[54] COLLECTION NETTING FOR FRUIT AND NUT TREES

[76] Inventors: Wilfred C. Frederiksen, 16881 Bolero La., Huntington Beach, Calif. 92649; Sun Y. Kim, 2384 Lancaster Ct., Hayward, Calif. 94542

[21] Appl. No.: 944,116

[22] Filed: Sep. 11, 1992

Related U.S. Application Data

[63] Continuation-in-part of Ser. No. 835,514, Feb. 14, 1992.

[51] Int. Cl.⁵ ............................................. A01D 46/00
[52] U.S. Cl. ........................................................ 56/329
[58] Field of Search ........................... 56/329, 328.1, 332

[56] References Cited

U.S. PATENT DOCUMENTS

| | | | |
|---|---|---|---|
| 57,766 | 9/1866 | Rauschert | 56/329 |
| 138,565 | 5/1873 | Kelsey | 56/329 |
| 816,186 | 3/1906 | Roberts | 56/329 |
| 853,833 | 5/1907 | Saum . | |
| 1,256,890 | 2/1918 | Flinn | 56/329 |
| 2,649,680 | 8/1953 | Brown | 56/329 |
| 3,616,629 | 11/1971 | Ooka | 56/329 |
| 4,901,513 | 2/1990 | Kim et al. | 56/329 |

FOREIGN PATENT DOCUMENTS

| | | | |
|---|---|---|---|
| 48519 | 1/1911 | Austria | 56/329 |
| 729845 | 12/1966 | Italy | 56/329 |
| 32843 | 3/1905 | Switzerland | 56/329 |
| 159089 | 12/1932 | Switzerland | 56/329 |

Primary Examiner—Stephen J. Novosad
Attorney, Agent, or Firm—Bielen, Peterson & Lampe

[57] ABSTRACT

A netting system for orchard trees for fruit or nut collection, the system having netting units constructed with a number of uniformly spaced struts angularly disposed around each tree with one end lodged in an anchoring device next to the tree trunk and the distal end aerially disposed, and a brace structure secured to the trunk of each tree with horizontal support members connected to the ends of the struts to stabilize the struts with a perimeter line interconnecting the distal ends of the struts and with net panels between struts connected to the perimeter line and to the struts to form a funnel-like, trapezoidal structure directing fruit or nuts to the base of the tree trunk where a basket gathers nuts for periodic collection and where in an orchard setting the perimeter line of the net panels at the top corners of the trapezoidal structure for one tree are interconnected with the perimeter line of diagonally adjacent net panels of another tree.

19 Claims, 5 Drawing Sheets

U.S. Patent  Mar. 2, 1993  Sheet 1 of 5  5,189,871
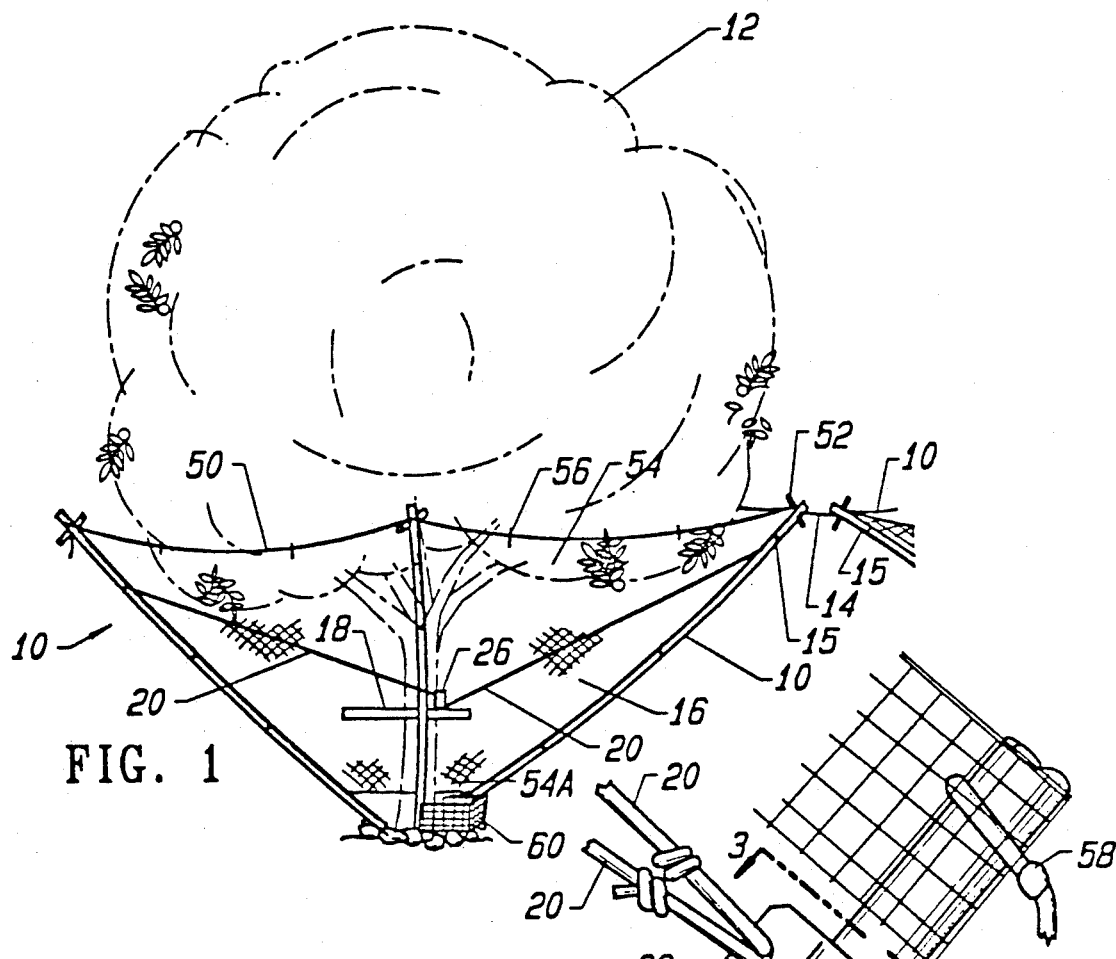
FIG. 1
FIG. 2
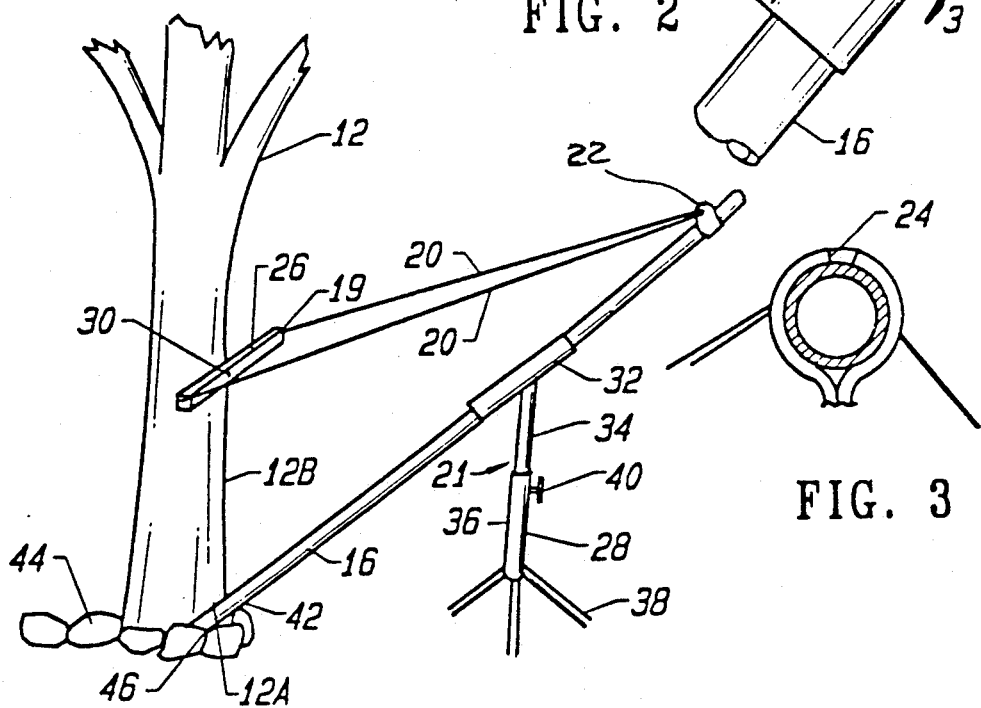
FIG. 4
FIG. 3

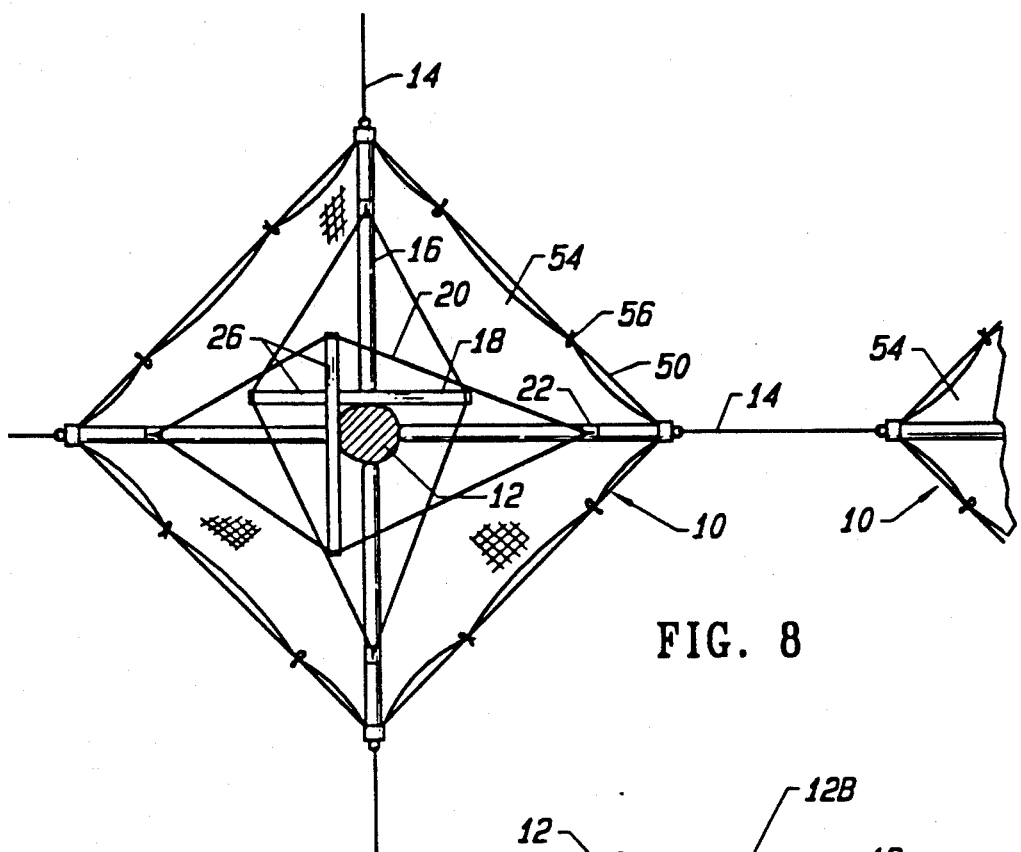
FIG. 8
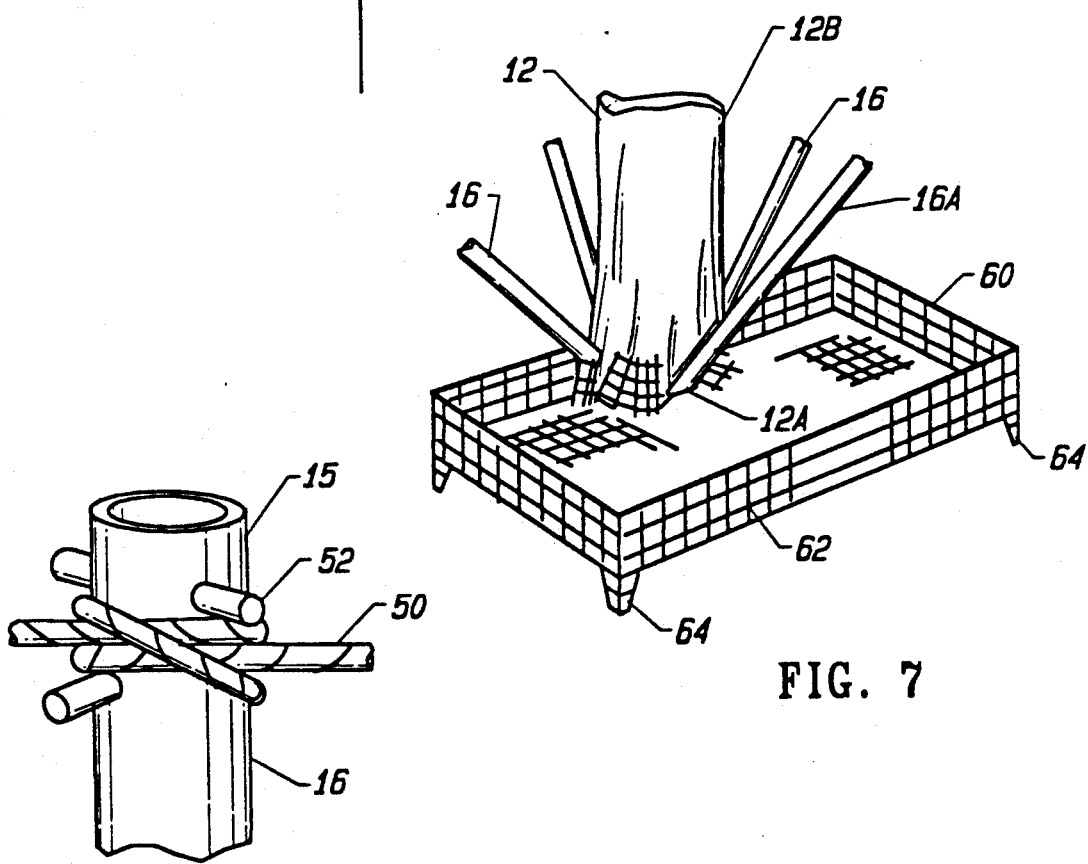
FIG. 7
FIG. 9

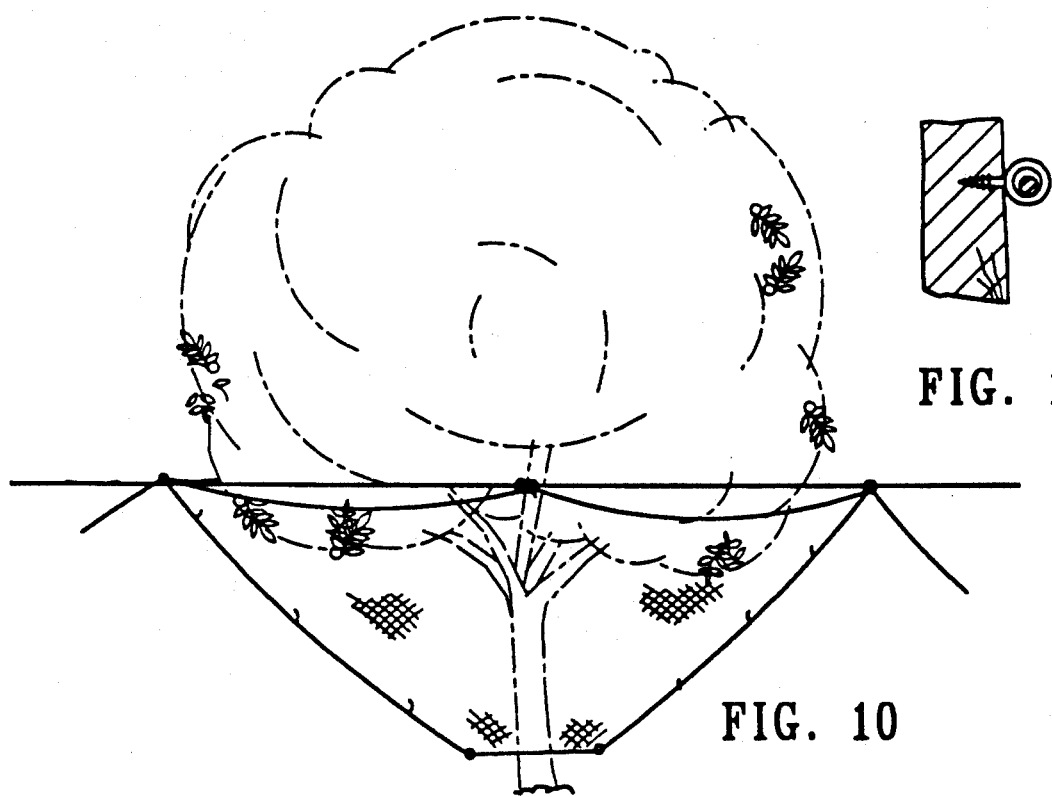
FIG. 11
FIG. 10
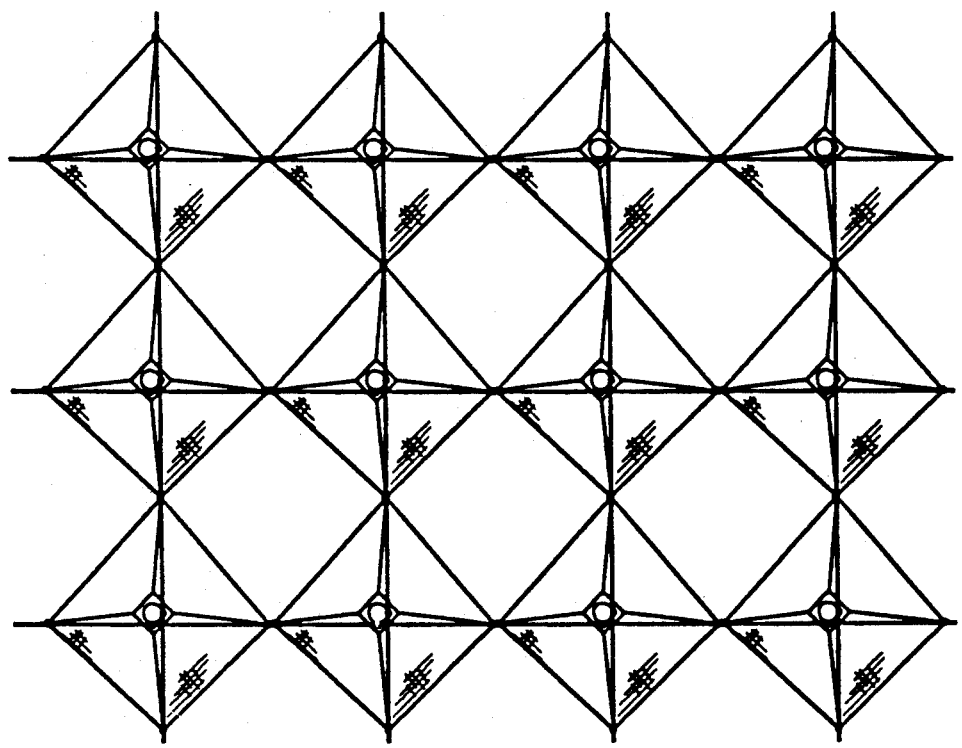
FIG. 12

COLLECTION NETTING FOR FRUIT AND NUT TREES

This application is a continuation-in-part of our copending application, Ser. No. 07/835,514, filed Feb. 14, 1992 of the same title.

BACKGROUND OF THE INVENTION

This invention relates to a netting system for fruit trees and in particular to the use of a net system in an established orchard of young or mature trees. The system is particularly adaptable to an orchard where the irregularity of terrain or lack of symmetry in the size and shape of trees makes a system as described in our U.S. Pat. No. 4,901,513 difficult or impossible to effectively install. Other embodiments can be used for individual trees or for trees organized in a uniform arrangement in an orchard.

It has been found that the system described in our referenced patent is more suitable for a uniform orchard of young or medium size trees and is particularly adapted to a new orchard where a center netting support pole is initially useful for assisting in the support of a young tree before the netting collection system is needed and installed. For fully mature trees having a dense foliage, such as a macadamia nut tree, it is difficult to install poles through the branches in line with the trunk and erect a netting around the tree.

The use of a netting system for fruit or nut trees is advantageous to gather falling fruit or nuts above ground to prevent spoilage and to facilitate periodic collection. For certain types of trees, such as the macadamia, where the nuts fall all during the year, the netting system substantially reduces the labor costs involved in repeated gathering. Because the rough, volcanic rock terrain frequently encountered in macadamia nut orchards often prevents expedient, mechanical collection, gathering fallen nuts must be accomplished manually with many nuts lost in lava rock soils. Additionally, macadamia nut trees are often planted on volcanic slopes where an interconnected orchard system has installation problems, and an individual netting system for each tree is sometimes preferred.

Where orchards include tens or hundreds of thousands of trees, the netting system must include components that are inexpensive and easy to assemble and erect to minimize capital expenses and labor costs involved in installing a system throughout a large orchard.

In a macadamia nut orchard having mature trees, the netting system must be erected around trees that may be forty feet high, with fruit bearing branches spanning a twenty five foot across collection area. Given the exposed terrain of many fruit and nut trees, a netting system that can withstand buffeting winds and periodically wet conditions is required.

It has been found that the use of semi-rigid supports is preferred over rigid supports to minimize damage from weather conditions. Common plastic tube ordinarily used as water pipe, is both durable and weather resistant. The plastic conduit is inexpensive, uniform, and readily available. Although plastic conduit for use long support poles lacks certain characteristics of structural integrity inherent in such natural semi-rigid poles as bamboo, the flexibility of the conduit pole can be controlled by the system design. Additionally, heavy, semi-rigid wire, preferably coated with a plastic, weatherproof coating is useable. The wire should have characteristics similar to common coat-hanger wire with equal or greater thickness and stiffness. While uncoated aluminum wire can be used, coated wire minimizes abrasion wear on the interconnected net.

The use of structural struts to assist in supporting a collection netting is not new. In the early U.S. Pat. No. 1,256,890 of Flynn, issued Feb. 19, 1918, entitled, Fruit Gatherer, struts connected at one end to a belt around the base of a tree and at the other end to the perimeter of the net served to support a net cinched around the trunk by a collar above the anchoring belt for the struts. Although this system is suitable for smaller trees where rigid struts are used, the system is not suitable for large trees where the length of the strut would allow unacceptable bending unless fabricated from a size that becomes uneconomical. Similarly, a system using metal struts disclosed in the Swiss Patent No. 32,843 of Däniken, issued Mar. 7, 1905 uses the struts to support the net and is practical only for smaller trees. In U.S. Pat. No. 57,766 of Rauschert, issued Sept. 4, 1866 and, Austria Patent No. 48,519 of Reimertshofer et al, issued Jan. 1, 1911 struts are used that abut the tree and connect to the perimeter of the net which are subject to excess bending as the collection area is increased.

In Swiss Patent No. 159,089 of Haase, issued Dec. 31, 1932 a netting system is disclosed in which contoured struts appear to be anchored to a belt and in part supported by the overlying net to which the strut is tied along the length of the strut. However, except for the tree branches proximate the net there is no means to stabilize the conical net during winds other than the overall rigidity of the assembly.

In U.S. Pat. No. 816,186 of Roberts, stakes are driven into the ground in a perimeter around the tree displaced from the trunk. The distal ends of the stakes are angled outwardly and connect to the perimeter of a net supported above the stakes with the net cinched around the trunk of the tree. While the stakes provide stable supports for a tree, they must be of limited length to remain rigid and as installed, limit access near the trunk of the tree.

These deficiencies in prior art systems inspired the development of systems that are adapted to large trees, yet remain inexpensive and easy to erect. While the problem of devising an efficient fruit gathering net may appear trivial, when applied to an orchard having thousands of trees, selection of materials and ease of assembly of structures is critical to viable implementation.

SUMMARY OF THE INVENTION

The netting system for fruit trees of this invention is adaptable to all sizes of fruit and nut trees having a central trunk, and the preferred embodiment is particularly adaptable to large trees. The system can be applied to a single tree or a large orchard and utilizes materials that are inexpensive and easily assembled. The design of the netting system allows field erection with a minimum of labor. The combined capital and labor costs necessary to install a system in a large orchard are easily recoverable from the substantial savings in collection costs by using the installed nets.

The preferred embodiments utilize four equally spaced struts having first ends set in the ground or otherwise anchored adjacent the base of the trunk of the tree with distal ends upwardly and outwardly angled to define the side edges of a truncated trapezoid. In one embodiment the four struts are each supported in place by a pair of tie lines connected to the ends of a horizontal cross piece secured high on the trunk of the tree. A single cross piece supports opposite struts such that the four struts are supported by two orthogonal cross pieces, which preferably are short segments of wood nailed to the tree. It has been found the tie lines should be upwardly directed to the upper third or quarter of the strut where it is tied to minimize the wind effect that tends to lift the net and dislodge the anchoring end of the strut. Other embodiments use an intertree cable connected high on the trunk of the trees such that the distal ends of the struts can attach to the cable stretched between trees and secured to the tree with a common I-bolt.

The net is preconfigured to the trapezoid configuration with a series of four panels that are interconnected along the support struts. Preferably, the net utilizes a perimeter line around the top of the net. This line is first secured to the ends of the four poles forming the struts to assist in supporting the struts which may be flexible and not sufficiently selfsupporting in the longer lengths of up to twenty feet. Bend in the struts is restrained by the top perimeter line and the net itself, which provides support to the struts which are tied to the net, preferably by spaced, quick connect straps spaced along the length of the poles or wire. During assembly, the four struts are arranged around the tree and tied in place by pairs of tie lines connected at one end to the spaced ends of the cross pieces and at the other end to the upper part of the poles. This part of the assembly can be performed from the ground. Alternately, the four struts are anchored at the base of the trunk and connected at their distal ends to the guy cables extending from tree to tree. A perimeter tension line interconnects the distal ends of the upwardly and outwardly angled poles. The net panels are draped from the aerial perimeter line and connected by ties. The edges of the preconfigured panels are brought together and interconnected with the struts using spaced ties. Alternately, where poles are employed as struts, the top perimeter edge of the net panels can be preconnected to the top line which have prespaced loops that can be installed over the pole ends. Since the side edges of the struts are only semi-rigid, they bend somewhat, depending on the material, and are restrained by the net and top tension line. This operates to spread out the net and stabilize the structure.

When assembled, the trapezoidally shaped net directs fruit or nuts down to the trunk where a container gathers the fruit for periodic collection.

BRIEF DESCRIPTION OF THE DRAWINGS

FIG. 1 is a elevational view of one embodiment of the netting system installed for large, mature trees.

FIG. 2 is an enlarged detailed view of a cross-support tie for a strut in the netting system of FIG. 1.

FIG. 3 is a cross-sectional view taken on the lines 3—3 in FIG. 2.

FIG. 4 is a side elevational view of an erection device for installing a netting system of the type shown in FIG. 1.

FIG. 7 is an enlarged perspective view of a collection basket for the netting systems.

FIG. 8 is a top plan view of the netting system of FIG. 1 for an orchard.

FIG. 9 is an enlarged detailed view of the tip of a pole-type support strut.

FIG. 10 is a side elevational view of a third embodiment of the netting system with wire netting struts installed in an orchard of large mature trees interconnected with guy cables.

FIG. 11 is a detail cross sectional view of an eye screw, cable connector.

FIG. 12 is a top view of the netting system of claim 10 in an orchard setting.

DETAILED DESCRIPTION OF THE PREFERRED EMBODIMENTS

Figure 5:
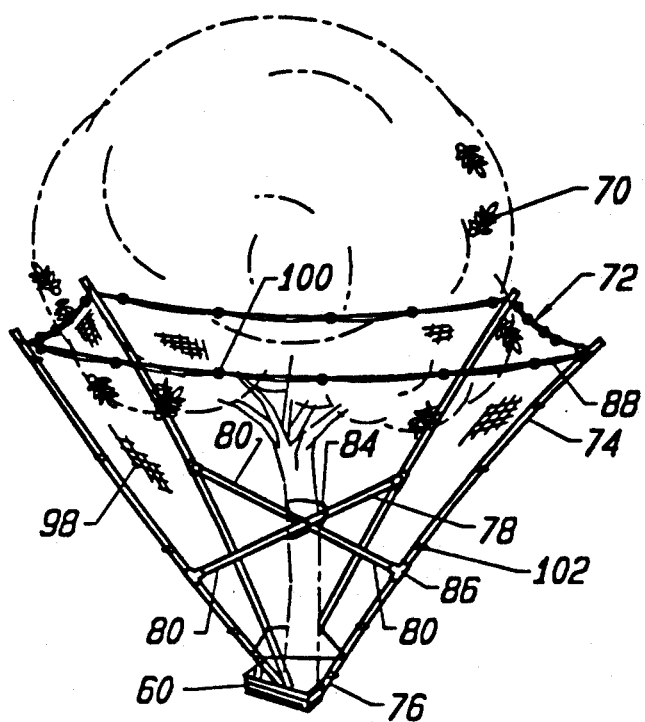
FIG. 5 is a top and side perspective view of a second embodiment of the netting system for a small or immature tree.

Referring to FIG. 1, the netting system is shown is one embodiment with a netting unit, designated generally by the reference numeral 10 installed under a large mature tree 12, shown in phantom. The netting unit 10 is interconnected with netting units of adjacent trees by a tension line 14 interconnecting the tips 15 of diagonally adjacent support struts 16. The support struts 16 are utilized to maintain the netting unit 10 in an open condition under adverse weather conditions. In the preferred embodiment, four elongated struts 16 are utilized and are sufficient to maintain the net in an open condition on a single tree. Although three or more struts may be employed in the netting unit, four struts are preferred for use in orchards where the trees are arranged in orthogonal rows. This enables the tips 15 of the struts of adjacent trees to be proximately positioned for interconnection by the tie lines 14 for effective use of the netting system in an orchard.

The four struts 16 are fabricated from semi-rigid materials such as bamboo pole, semi-rigid wire, or preferably three-quarter inch, schedule forty, PVC conduit having a one inch outside diameter. Although the conduit is somewhat more flexible than bamboo, the availability of conventional PVC water conduit in substantial quantities renders the material attractive for large orchard installations. The uniformity of the material permits a uniform installation using a consistent design. Furthermore, the use of the particular cross-brace structure described herein enables the flexibility of the conduit to be used to advantage in providing an aesthetically pleasing structure when installed. The configuration of the installed netting unit 10 is substantially that of an inverted, truncated pyramid with the struts defining the edges, and providing a curved warp to the netting surface by the outward bend of the middle of the angled struts.

In the embodiments of FIG. 1, as shown also in FIGS. 2-4, the struts 16 comprise twenty foot lengths of conduit that are arranged such that with one end of the strut 16 is wedged in the ground abutting the base 12A of the trunk 12B of the tree 12, the tip 15 of the strut projects approximately ten feet above the ground. This low elevation enables installation to be accomplished utilizing a conventional ladder or other ordinary elevational means that can be arranged in the field. The elevation is sufficiently high to enable maintenance or crop collection vehicles to pass between trees.

The struts 16 are supported in the incline position by a cross-brace structure 18 interconnecting the struts with the trunk 12b of the tree 12. The cross-brace structure 18 includes crossed brace members 19 with nylon lines 20 which are connected at one end to the struts 16 by a plastic bracket 22 that is shown in greater detail in FIGS. 2 and 3. The plastic bracket 22 has a ring split 24 which enables the bracket to be installed around the tubular strut 16 and fastened in place by a quick setting glue. The pair of lines 20 connected to the bracket 22 on each strut 16 are connected at their opposite end to the ends of the brace member 19. For the mature tree of FIG. 1, each brace member 19 comprises a length of one-by-one wood stock approximately four feet in length. The tension lines 20 provide stability to maintain the appropriate positioning and incline to each strut 16 and to the unit 10 on assembly. To prevent winds from lifting the struts from their anchor position at the base of the tree, it is preferred that the bracket be positioned for fastening the struts one quarter or one third distance from their distal ends.

Because of the unwieldy length of the struts 16 for the large or mature tree 12, an installation device 21 is used to assist the installer in positioning the strut 16 in a correct orientation. The installation device 21 not only allows erection to be accomplished by an individual, if necessary, but provides for general uniformity when erecting nets in an orchard. A brace member 19 is first pinned to the tree 1 about six feet above the ground by a nail 30 or other fastening means and the strut 16 is supported on the installation device 21 with one end 42 wedged into the ground at the base 12a of the tree. Alternately, the struts can be anchored by tying the ends to a belt or rope encircling the trunk. An L-channel 32 mounted on the end of a telescoping extension 34 is oriented in a V-position to form a trough in which the strut rests. The extension 34 extends from the body 36 of the installation device 28 and the body 36 is supported on a tri-pod 38 set on the ground. The appropriate height for a given distance from the base 12a of the tree 12 is obtained by adjusting the extension 34 and fixing the height of the L-channel 32, using a turn-screw clamp 40. With one end 42 of the strut 16 wedged in the soil material 44 around the base of the tree, the tip 15 projects into the air approximately ten feet above the ground. In macadamia nut orchards, the soil 44 is commonly lava rock and anchoring of the end 42 of the strut 16 may be accomplished by use of wedging rock 46.

With the strut 16 in position resting on the installation device 21, the tie lines 20 are fastened to the ends of the cross brace 19 and to the plastic bracket 22, which has been glued to the strut 16 at a convenient location. After the four struts have been positioned and secured with the tie lines 20, a top perimeter line 50 is fastened to the tips 15 of the struts 16. Preferably, the tip 15 has been equipped with cross pegs 52 to prevent the perimeter line 50 from slipping up or down the strut tip 15 when secured by a simple clove hitch. The ends (not shown) of the line 50 can simply be tied together between or at a strut tip 15.

After the perimeter line 50 is secured, four trapezoidal net panels 54 are draped from the line 50, being secured at the top by a series of ties 56, which can comprise short segments of line or plastic quick connectors 58. The plastic quick connectors, which are small straps with a cross corregated surface that locks in a slot housing 57, are preferred for spaced use along the struts 16 to connect the panels 54 to the struts 16 as shown in FIG. 2.

The wedge-shaped or trapezoidal panels 54 are truncated at the inverted tip 54a to provide open space at the base 12a of the trunk 12b for insertion of a pair of rectangular collection baskets 60, one of which is shown in FIGS. 1 and 10. Together, the four panels form a truncated, inverted pyramid that directs falling fruit or nuts to the positioned baskets at the trunk.

The collection baskets 60 are fabricated from a one-piece wire screen 62, and preferably are shaped to maintain the collected nuts off the ground by use of added corner pedestals 64. The pedestals 64 are shaped from folded, square, corner sections removed from the screen 62 when forming the sides of the basket 60. Two baskets 60 are positioned between the four struts 16 at the base 12a of each tree 12. Part of one side 66 and the bottom are cut and spliced to accommodate the tree trunk 12b and the intermediate strut 16a. A second basket (not shown) abuts the basket shown in FIG. 10, with the common side 66 bent to accommodate the struts 16. The baskets can be manually dumped during periodic harvest, or a vacuum device can be used to hose out the containers for semi-automated collection.

Figure 6:
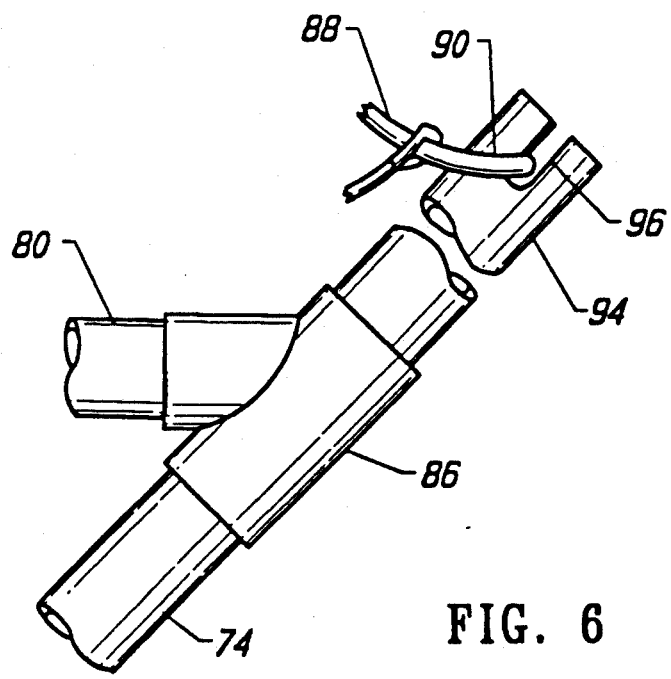
FIG. 6 is an enlarged detail of a cross-support member and strut interconnection fitting and strut tip for the netting system of FIG. 5.

With reference to FIGS. 5 and 6, smaller trees 70 utilize a similar netting unit 72 as provided for the larger trees 12. The netting unit 72 includes four struts 74 with one end 76 of each strut lodged in the ground adjacent the base of the tree 70. A cross brace structure 78 connects diametrically opposite struts 74 with cross members 80. At the intersection 82 of the cross members 80, the members are taped or tied together by a strap 84 which encircles the trunk of the tree 70 and stabilizes the cross brace structure 78 relative to the tree.

Preferably, the struts 74 and cross brace members 80 are formed from one-half inch, schedule forty, PVC, having a three-quarter inch outside diameter. The struts 74 and cross brace members 80 are interconnected using lateral fittings 86 which are preferably split in a manner similar to the line brackets 22 for ease of assembly.

A top perimeter line 88 having loops 90 connect to the distal end 94 of the struts 74 and are retained in end notches 96 as shown in FIG. 6. The net panels 98 are suspended from the perimeter line 88 from which they are attached using plasticcoated, wire twists 100. Similarly, the panels 98 are secured together along their edges and to the struts 74 by similar twists 102. A pair of collections baskets 60 of the type shown in FIG. 10 are placed under the nets to gather the nuts for periodic collection.

The nets are preferably of monofilament, interconnected web construction, preferably having one-quarter to one-half inch square openings. This material is suitable for macadamia nuts, and fruit and nuts having larger or smaller diameters may utilize netting having different size webbing, accordingly. All lines are preferably nylon to withstand the outdoor environment, and all materials are generally selected to be weather and sun resistant to maximize the capital investment of a net equipped orchard.

Referring now to FIGS. 10-14, an alternate embodiment of the net system is shown. In the construction of the net system of FIG. 10, a net unit, designated generally by the reference numeral 150 is shown with semi-rigid struts 152 tied to trapezoidal net panels 154, with wire ties 156. The net panels 154 have a top perimeter line 158 that is threaded through the top edge of the net panels and connected to the end of the wire struts 152.

The ends 160 of the struts 152 are bent around guy cables 162 to intersect at the upper trunk 164 of a mature tree 12. The guy cables 162 are attached to the tree 12 by eye-screws 166 as shown in FIG. 11. Preferably, the cable is allowed to linearly displace in the eye-screw 166 to reduce tension on the cable in the event of high winds and tree motion. The cables 162 extend to the edge of the orchard where they are connected to an end pole 168 and secured to an anchoring stake 170 that is firmly set into the ground.

The net panels 154 form a cone-like trapezoidal funnel directing nuts and fruit down toward the base 172 of the tree. The bottom edge of the trapezoidal net structure may be interconnected with a similar semi-rigid, but bendable wire 174, which may be anchored to a collection basket 60 one half of which is shown in FIG. 10. Simple ties 176 can be used to interconnect the base wire 174 with the basket 60.

The upper end 160 of the wire struts 152 are interconnected to the diagonally adjacent strut member 152a of the adjacent tree 12a as shown in FIG. 12. Where for reasons of poor spacing of trees or other inconsistencies, the ends of the struts cannot be stretched to directly interconnect, a tie line as in FIG. 1 can be utilized for the interconnection. Simply connecting to the guide cable may cause slippage during high winds and the like, and interconnection with the net system of a neighboring tree is preferred.

Figure 13:
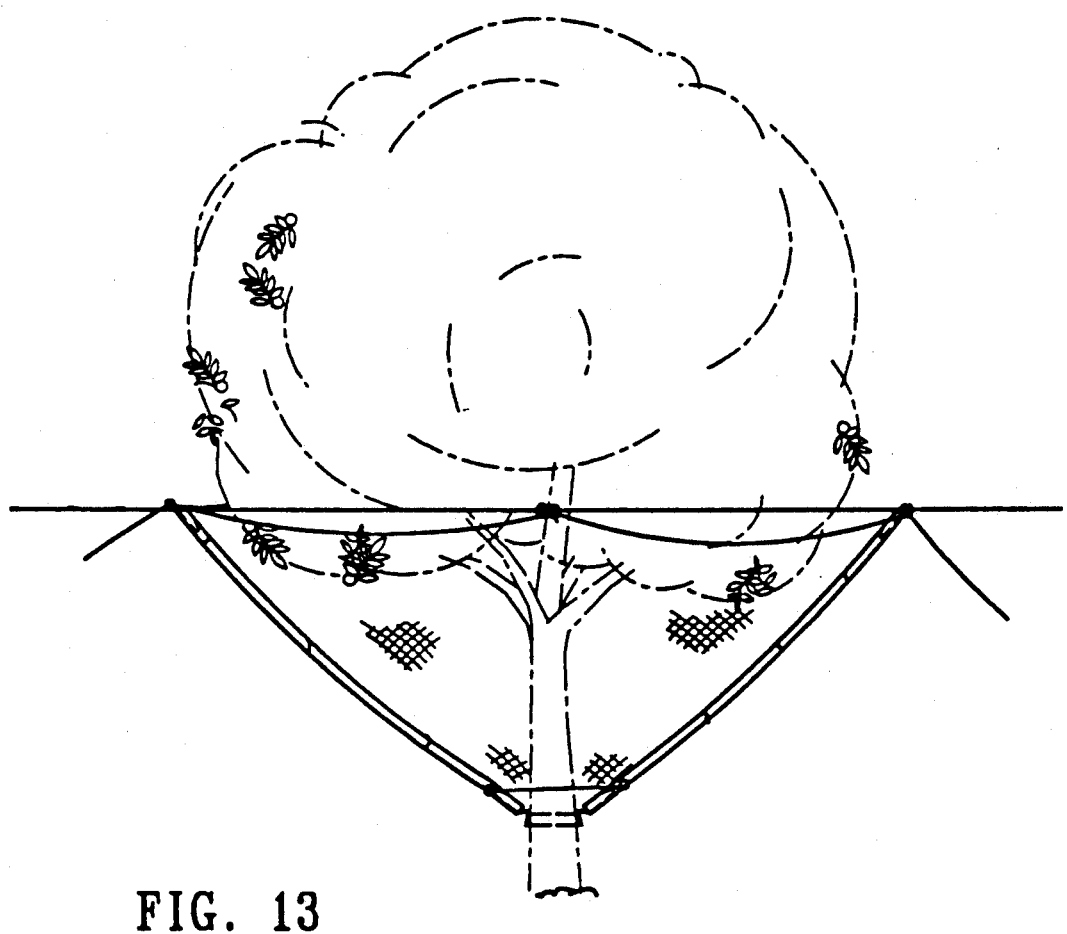
FIG. 13 is a side elevational view of the netting system of FIG. 10 with pole netting struts substituted for the wire struts.
Figure 14:
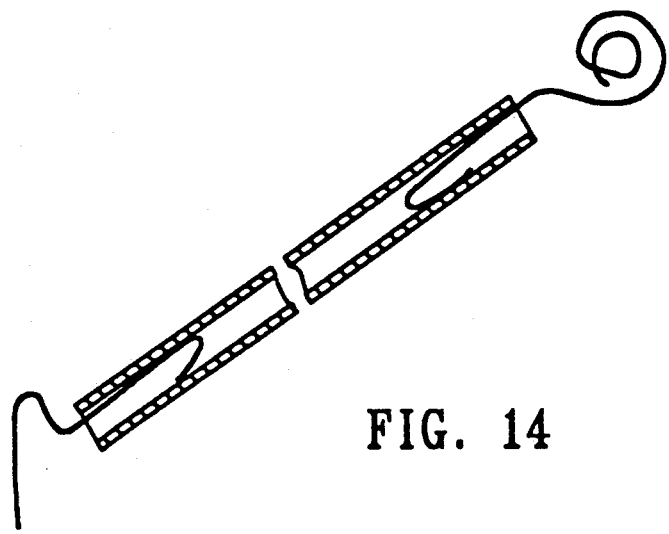
FIG. 14. is a cross-sectional view of a pole strut with wire end connectors.

As shown in FIG. 12, the net array takes on a pattern where approximately one half of the projected ground area is covered by net. The guy cables 162 intersect in a matrix at the trunk of each tree. Note that in FIG. 12, foliage shown in phantom for one tree would generally obscure the net from a aerial view. Referring now to FIGS. 13 and 14, a modification to the embodiment of FIG. 10 is shown wherein struts 180 are formed from the lengths of plastic conduit of the type show with reference to FIG. 1. The strut 180 is formed of a conduit pole 182 with bent wire insets 184 and 186 inserted in each end of the conduit pole 182. The upper inset 186 connects to the guy cable 162 and concurrently to the inset of the diagonally adjacent net unit. The lower inset 184 has a downwardly bent prong 188 that is installed into a strap 190 that encircles the base of the tree. A basket (not shown) is installed under the net unit 150 in the manner previously described. Except for the structural difference in the strut 180, the netting system operates in the same manner as that disclosed with reference to FIG. 10.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A netting system for fruit or nut collection from orchard trees having a central trunk with a base at the ground, comprising;
    a netting unit around each orchard tree, each netting unit having:
    at least three or more elongated support struts uniformly spaced around each tree having first ends anchored at the base of the tree and distal second ends displaced a distance from the trunk of the tree and elevated from the ground, wherein the struts are angularly disposed around the tree;
    a perimeter tie line interconnecting the distal second ends of the struts;
    a cross brace structure having cross brace members horizontally fastened to the trunk of the tree with the brace members having ends displaced from the trunk of the tree with means for interconnecting the ends of each brace member with at least one strut at a location between the ends of the strut;
    a plurality of wedge-shaped net panels, each net panel being disposed between adjacent struts with the net panels having a top edge connected to the perimeter tie line and opposite side edges, connected spaced struts, wherein a funnel-like net structure is formed.

2. The netting system of claim 1 wherein the net unit utilizes four struts and the cross brace structure includes two, orthogonal, cross brace members, each cross brace member having ends connected to diagonally opposite struts.

3. The netting system of claim 2 wherein the ends of the cross brace members are directly connected to the struts, and wherein the means for interconnecting the ends of the cross brace members with the struts are fittings on the struts that engage the ends of the cross brace members.

4. The netting system of claim 1 wherein the ends of the cross brace members indirectly connect to the struts, and wherein the means for interconnecting the ends of the cross brace members with the struts are a plurality of tie lines each strut having two tie lines with first ends connected to the strut and with second ends connected to the opposite ends of a cross brace member.

5. The netting system of claim 4 wherein the netting unit includes two, orthogonal, cross brace members, each cross brace member being connected by tie lines to two diametrically opposite struts.

6. The netting system of claim 1 wherein the netting unit for each tree has connection means at the distal second ends of the struts for connecting the distal end of each strut in each unit with the proximate distal end of a strut in an adjacent unit in an orchard system.

7. The netting system of claim 1 wherein the net panel includes a truncated bottom edge disposed above the ground, wherein an open space is provided and the netting unit includes gathering means for gathering fruit or nuts directed toward the base of the trunk of the tree by the net panels.

8. The netting system of claim 7 wherein the gathering means comprises a pair of baskets each having a configuration constructed to enable the basket to encompass half of the circumference of the base of the trunk of the tree, wherein the pair of baskets in tandem encompass the trunk of the tree for receiving fruit or nuts directed to the baskets by the net panels.

9. The netting system of claim 5 wherein each strut has a connector bracket mounted on the strut and the tie lines are connected at their first ends to the connector bracket.

10. The netting system of claim 1 including further, an installation means for supporting each strut in an agularly disposed position prior to interconnection of the strut with the cross base structure.

11. The netting system of claim 1 wherein the struts comprise conventional plastic water conduit.

12. A netting system for fruit or nut collection from orchard trees having a central trunk with a base at the ground comprising:

a netting unit around each orchard tree, each unit having: four net support struts spaced uniformly around the tree extending upwardly and outwardly from the trunk, the struts having first ends anchored at the base of the tree and distal second ends displaced a distance from the trunk of the tree and elevated from the ground;

a plurality of horizontal, elevated guy cables with cable pairs crossing at a high point adjacent to the trunk with the cables having connection means for connecting the cables to the trunk at an elevated position on the trunk, the cables extending to adjacent trees in the orchard forming a matrix;

connection means at the distal ends of the struts for connecting the ends of the struts to the guy cables wherein diagonally opposite struts connect to the same cable spatially apart; and four wedge-shaped net panels, each net panel being disposed between adjacent struts with the panels having opposed edges connected to the struts to form a funnel of inverted pyramid shape to direct nuts to the base of the tree.

13. The netting system of claim 12 wherein the struts are formed of semi-rigid wire.

14. The netting system of claim 13 wherein the wire is coated with a weather protective coating.

15. The netting system of claim 13 wherein the struts are formed of plastic conduit.

16. The netting system of claim 15 wherein the struts comprise tubular poles with connection means at each end for connecting means at each end for connecting the poles to the base of the tree and to the guy cables.

17. The netting system of claim 1 wherein a plurality of netting units are deployed in an orchard of trees with adjacent trees having the proximate distal second end of net support struts interconnected.

18. The netting system of claim 17 wherein the guy cables have connection means for connecting the guy cables at an elevated location on the trunk of the orchard trees.

19. The netting system of claim 18 wherein the connection means comprise eye screws through which the cable is threaded.

* * * * *